US008861424B2

(12) United States Patent
Chen et al.

(10) Patent No.: US 8,861,424 B2
(45) Date of Patent: Oct. 14, 2014

(54) DOWNLINK CONTROL CHANNEL FOR RELAY RESOURCE ALLOCATION

(75) Inventors: Wanshi Chen, San Diego, CA (US); Aamod Dinkar Khandekar, San Diego, CA (US); Alexei Yurievitch Gorokhov, San Diego, CA (US); Juan Montojo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 668 days.

(21) Appl. No.: 12/830,096

(22) Filed: Jul. 2, 2010

(65) Prior Publication Data

US 2011/0164550 A1 Jul. 7, 2011

Related U.S. Application Data

(60) Provisional application No. 61/223,331, filed on Jul. 6, 2009.

(51) Int. Cl.
*H04W 72/04* (2009.01)
*H04B 7/155* (2006.01)
*H04W 84/04* (2009.01)
*H04W 92/20* (2009.01)

(52) U.S. Cl.
CPC .......... *H04W 72/042* (2013.01); *H04W 84/047* (2013.01); *H04B 7/15542* (2013.01); *H04W 92/20* (2013.01)
USPC .......................................... 370/315; 370/330

(58) Field of Classification Search
CPC ... H04L 5/0091; H04L 5/0053; H04L 5/0007; H04L 5/0094; H04W 72/0426; H04W 84/047
See application file for complete search history.

(56) References Cited

U.S. PATENT DOCUMENTS

| | | | | |
|---|---|---|---|---|
| 2010/0214972 | A1* | 8/2010 | Che et al. | 370/315 |
| 2010/0254301 | A1* | 10/2010 | Blankenship et al. | 370/315 |
| 2011/0292865 | A1* | 12/2011 | Seo et al. | 370/315 |
| 2012/0002598 | A1* | 1/2012 | Seo et al. | 370/315 |
| 2012/0026934 | A1* | 2/2012 | Park et al. | 370/315 |
| 2012/0033603 | A1* | 2/2012 | Seo et al. | 370/312 |
| 2012/0069790 | A1* | 3/2012 | Chung et al. | 370/315 |
| 2012/0069795 | A1* | 3/2012 | Chung et al. | 370/315 |
| 2012/0076071 | A1* | 3/2012 | Kim et al. | 370/315 |
| 2012/0087331 | A1* | 4/2012 | Seo et al. | 370/329 |
| 2012/0093059 | A1* | 4/2012 | Bai et al. | 370/312 |
| 2012/0099519 | A1* | 4/2012 | Kim et al. | 370/315 |
| 2012/0099520 | A1* | 4/2012 | Kwon et al. | 370/315 |
| 2012/0147846 | A1* | 6/2012 | Ho et al. | 370/330 |

OTHER PUBLICATIONS

"Backhaul link design in support of relaying operation", Source: Qualcomm Europe, 3GPP TSG-RAN WG1 #57bis, R1-092702, Los Angeles, CA, USA, Jun. 29-Jul. 3, 2009.

(Continued)

*Primary Examiner* — Min Jung (57) ABSTRACT

Certain aspects of the present disclosure provide a method for wireless communications. The method generally includes allocating resources of a backhaul link between a donor base station and a relay base station to the relay station for communicating with the donor base station and transmitting a control channel indicating the allocated resources to the relay base station, wherein the control channel is transmitted on a subset of physical resource blocks (PRBs) of subframes assigned for downlink communications on the backhaul link.

45 Claims, 9 Drawing Sheets

(56) References Cited

OTHER PUBLICATIONS

"Text proposal on backhaul resource assignment", Source: Nokia, Nokia Siemens Networks, Ericsson, Motorola, RIM, TI, NEC, Samsung, Huawei, CATT, LGE, CMCC, Qualcomm, ZTE, 3GPP TSG RAN WG1 Meeting #57, R1-092249, San Francisco, CA USA, May 4-8, 2009.
3rd Generation Partnership Project; Technical Specification Group Radio Access Networf; Further Advancements for E-UTRA Physical Layer Aspects(Release 9), 3GPP Draft; TR 36.814__130, 3rd Generation Partnership Project (3GPP), Mobile Competence Centre ; 650, Route Des Lucioles ; F-06921 Sophia-Antipolis Cedex ; France, No. Shenzhen, China; Aug. 24, 2009, Jun. 1, 2009, pp. 1-46, XP050388254, [retrieved on Aug. 28, 2009].
Huawei: "Considerations on R-PDCCH for Type 1 relays" 3GPP Draft; R1-092375, 3rd Generation Partnership Project (3GPP), Mobile Competence Centre ; 650, Route Des Lucioles ; F-06921 Sophia-Antipolis Cedex ; France, No. Los Angeles, USA; Jun. 24, 2009, XP050350893 [retrieved on Jun. 24, 2009] p. 2, paragraph 2.3, lines 1-5 p. 2, figure 1 p. 2, figure 2.
International Search Report and Written Opinion—PCT/US2010/041100—International Search Authority, European Patent Office,Oct. 27, 2010.
LG Electronics: "Resource Allocation and Downlink Control Channel Structure for Relay Backhaul Link" 3GPP Draft; R1-092115 LGE__Backhaul Resource Allocation, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339560 [retrieved on Apr. 28, 2009] p. 2, figure 1.
NEC Group: "Control Structure for Relay Type 1 nodes" 3GPP Draft; R1-092965 Control Structure for Relay Type 1 Nodes—Updated, 3rd Generation Partnership Project (3GPP), Mobile Competence Centre ; 650, Route Des Lucioles ; F-06921 Sophia-Antipolis Cedex ; France Jun. 29, 2009, XP002601697 [retrieved on Sep. 21, 2010] p. 2, line 15-1 ine 27 p. 3, line 9-line 28 p. 2, figure 2.
Nokia Siemens Networks: "TP to 36.912 on Relays and Carrier Aggregation" 3GPP Draft; R2-093694 TP 36912 on Relays and CA, 3rd Generation Partnership Project (3GPP), Mobile Competence Centre ; 650, Route Des Lucioles F-06921 Sophia-Antipolis C E~E X; France, No. Los Angeles, USA; Jun. 24, 2009, XP050351931 [ retrieved on 2009-06-241 p. 4, paragraph 9.1, lines 1-2 p. 4, paragraph 9.3.1: lines 1-3 p. 5 , paragraph 9.3.3, lines 7-14 p. 4, figu e 9.1-1.
ZTE: "Control Channel Structure and Mapping Pattern of Backhaul Link" 3GPP Draft; R1-091424 Control Channel Structure and Mapping Pattern of Backhaul Link, 3rd Generation Partnership Project (3GPP), Mobile Competence Centre ; 650, Route Des Lucioles ; F-06921 Sophia- Antipolis Cedex ; France, No. Seoul, Korea; 20090317, Mar. 17, 2009, XP050339004 [retrieved on Mar. 17, 2009] p. 3, paragraph 2.4, lines 1-3 p. 4, figure 2a p. 3, figure 1a.
LG Electronics et al., "Introduction of CR for downlink DVRB mapping to PRB", 3GPP TSG RAN WG1 #53 R1-081818, 3GPP, May 9, 2008.
Nortel: "Control Channel and Data Channel Design for Relay Link in LTE-Advanced", 3GPP TSG-RAN Working Group1 Meeting #56 R1-090753, 3GPP, Feb. 13, 2009.
3GPP TS 36.213 V8.5.0, "3rd Generation Partnership Project; Technical Specification Group Radio Access Network; Evolved Universal Terrestrial Radio Access (E-UTRA); Physical layer procedures (Release 8)" 3rd Generation Partnership Project (3GPP); Technicalspecification (TS), XX, XX, [Online] vol. 36.213, No. TS 36.213 V8.5.0, Dec. 1, 2008, pp. 1-74, XP002572343 Retrieved from the Internet: URL:http://www.3gpp.org/ftp/Specs/archive/ 36__series/36.213/> [retrieved on Feb. 25, 2010].
Taiwan Search Report—TW099122202—TIPO—Jan. 23, 2014.

\* cited by examiner

DOWNLINK CONTROL CHANNEL FOR RELAY RESOURCE ALLOCATION

CLAIM OF PRIORITY UNDER 35 U.S.C. §119

The present Application for patent claims benefit of U.S. Provisional Patent Application Ser. No. 61/223,331, entitled, "Systems and Methods of Interaction for LTE-A Control Design with PDSCH Resource Allocation," filed Jul. 6, 2009, and assigned to the assignee hereof and hereby expressly incorporated by reference herein.

BACKGROUND

Field

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes allocating resources of a backhaul link between a donor base station and a relay base station to the relay station for communicating with the donor base station and transmitting a control channel indicating the allocated resources to the relay base station, wherein the control channel is transmitted on a subset of physical resource blocks (PRBs) of subframes assigned for downlink communications on the backhaul link.

Certain aspects of the present disclosure provide a method for wireless communications. The method generally includes receiving a control channel indicating allocated resources of a backhaul link between a donor base station and a relay base station to the relay station for communicating with the donor base station, wherein the control channel is transmitted on a subset of physical resource blocks (PRBs) of subframes assigned for downlink communications on the backhaul link and communicating with the donor base station over the backhaul link using the allocated resources.

Certain aspects of the present disclosure provide an apparatus for wireless communications. The apparatus generally includes means for allocating resources of a backhaul link between a donor base station and a relay base station to the relay station for communicating with the donor base station and means for transmitting a control channel indicating the allocated resources to the relay base station, wherein the control channel is transmitted on a subset of physical resource blocks (PRBs) of subframes assigned for downlink communications on the backhaul link.

Certain aspects of the present disclosure provide an apparatus for wireless communications. The apparatus generally includes means for receiving a control channel indicating allocated resources of a backhaul link between a donor base station and a relay base station to the relay station for communicating with the donor base station, wherein the control channel is transmitted on a subset of physical resource blocks (PRBs) of subframes assigned for downlink communications on the backhaul link and means for communicating with the donor base station over the backhaul link using the allocated resources.

Certain aspects of the present disclosure provide an apparatus for wireless communications. The apparatus generally includes at least one processor configured to allocate resources of a backhaul link between a donor base station and a relay base station to the relay station for communicating with the donor base station, and transmit a control channel indicating the allocated resources to the relay base station, wherein the control channel is transmitted on a subset of physical resource blocks (PRBs) of subframes assigned for downlink communications on the backhaul link; and a memory coupled with the at least one processor.

Certain aspects of the present disclosure provide an apparatus for wireless communications. The apparatus generally includes at least one processor configured to receive a control channel indicating allocated resources of a backhaul link between a donor base station and a relay base station to the relay station for communicating with the donor base station, wherein the control channel is transmitted on a subset of physical resource blocks (PRBs) of subframes assigned for downlink communications on the backhaul link, and communicate with the donor base station over the backhaul link using the allocated resources; and a memory coupled with the at least one processor.

Certain aspects of the present disclosure provide a computer-program product for wireless communications, the computer-program product comprising a computer-readable medium. The computer-readable medium generally includes code for allocating resources of a backhaul link between a donor base station and a relay base station to the relay station for communicating with the donor base station and transmitting a control channel indicating the allocated resources to the relay base station, wherein the control channel is transmitted on a subset of physical resource blocks (PRBs) of subframes assigned for downlink communications on the backhaul link.

Certain aspects of the present disclosure provide a computer-program product for wireless communications, the computer-program product comprising a computer-readable medium. The computer-readable medium generally includes code for receiving a control channel indicating allocated resources of a backhaul link between a donor base station and a relay base station to the relay station for communicating with the donor base station, wherein the control channel is transmitted on a subset of physical resource blocks (PRBs) of subframes assigned for downlink communications on the backhaul link and communicating with the donor base station over the backhaul link using the allocated resources.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
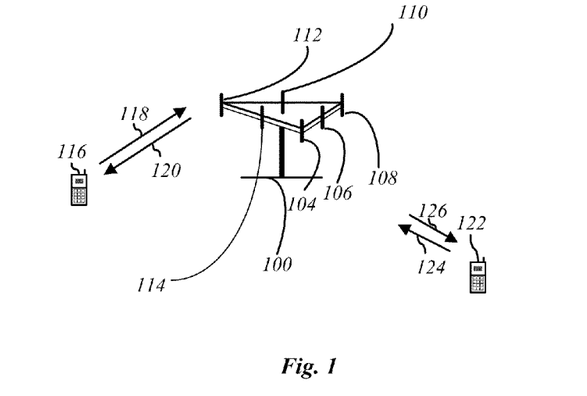
FIG. 1 illustrates a multiple access wireless communication system according to one embodiment.

Referring to FIG. 1, a multiple access wireless communication system according to one embodiment is illustrated. A access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
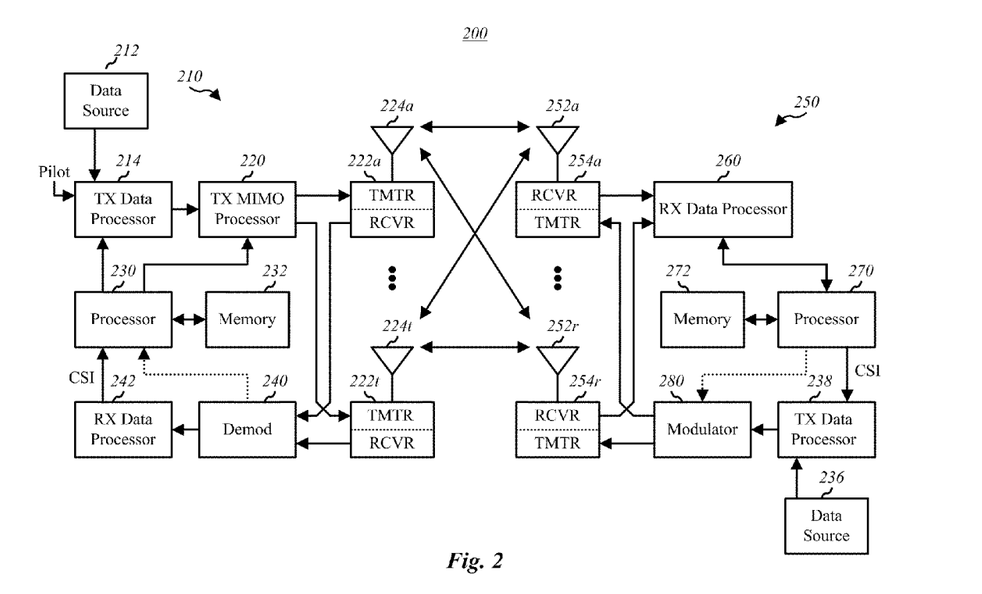
FIG. 2 is a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprise Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), a Uplink Shared Data Channel (UL-SDCH) and plurality of PHY channels. The PHY channels comprise a set of DL channels and UL channels.

The DL PHY Channels Comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels Comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 3:
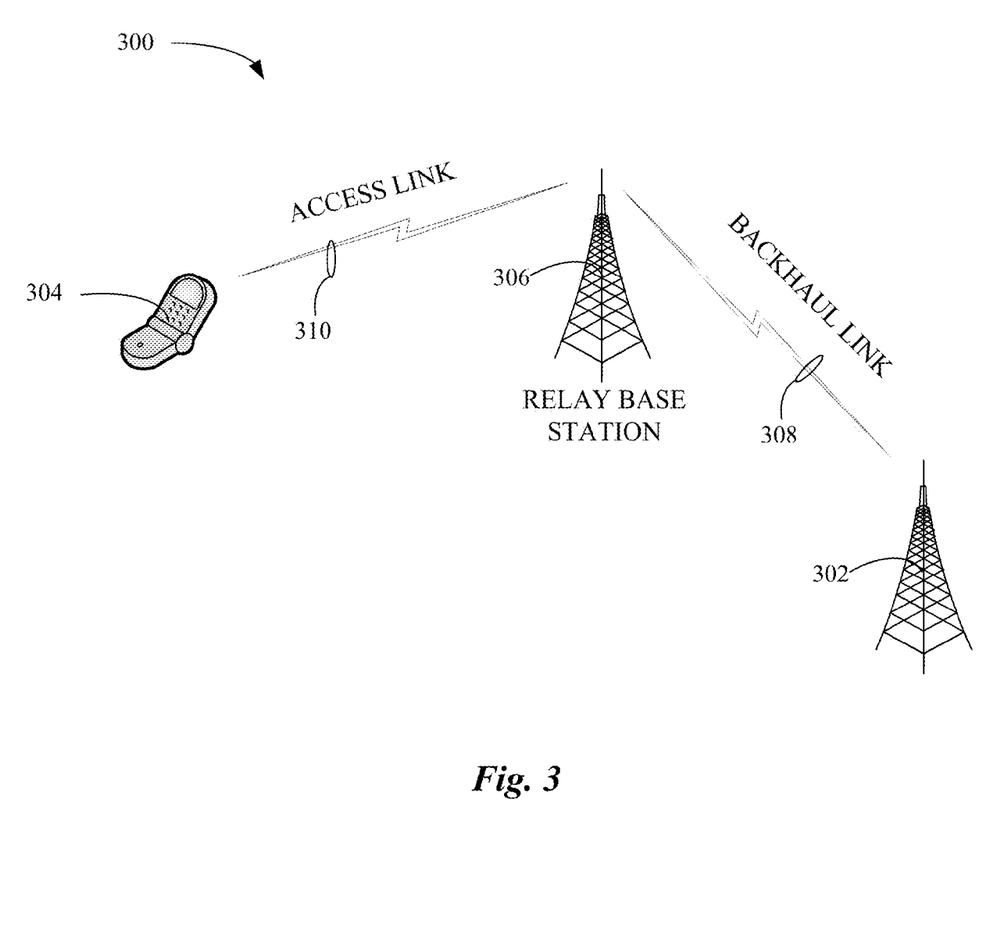
FIG. 3 illustrates an exemplary wireless communications system with a relay base station according to an aspect of the present disclosure.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control- CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel An Example Relay System FIG. 3 illustrates an example wireless system 300 in which certain aspects of the present disclosure may be practiced. As illustrated, the system 300 includes a donor base station (BS) 302 that communicates with a user equipment (UE) 304 via a relay BS 306. The relay base station 306 may communicate with the donor BS 302 via a backhaul link 308 and with the UE 304 via an access link 310.

In other words, the relay base station 306 may receive downlink messages from the donor BS 302 over the backhaul link 308 and relay these messages to the UE 304 over the access link 310. Similarly, the relay BS 306 may receive uplink messages from the UE 304 over the access link 310 and relay these messages to the donor BS 302 over the backhaul link 308.

The relay base station 306 may, thus, be used to supplement a coverage area and help fill "coverage holes." According to certain aspects, a relay BS 306 may appear to a UE 304 as a conventional BS. According to other aspects, certain types of UEs may recognize a relay BS as such, which may enable certain features.

Example Relay Physical Control Channel Design

Certain aspects of the present disclosure provide techniques for allocating resources of a backhaul link to a relay base station (or relay node B) for use in communicating with a donor base station (or donor node B). According to certain aspects, a relay physical downlink control channel (R-PDCCH) may be transmitted using a subset of physical resource blocks (PRBs) of subframes assigned to the downlink backhaul link. The R-PDCCH may be used to assign downlink resources in the same subframe and/or in one or more later subframes and to assign uplink resources in one or more later subframes.

According to certain aspects, the R-PDCCH, may be used by the donor eNB to dynamically or semi-persistently assign resources for DL as well as UL data (referred to as R-PDSCH and R-PUSCH respectively). Moreover, it may be assumed that R-PDCCH is transmitted on a subset of the OFDM symbols of the subframes assigned for the downlink backhaul link. Such subset of OFDM symbols may include the full set of OFDM symbols available for the backhaul link. Additionally, it may be assumed that the R-PDCCH is transmitted starting from an OFDM symbol within the subframe that is late enough so that the relay can receive it.

Typically, there are several techniques available for multiplexing the R-PDCCH within a DL backhaul subframe, such as frequency division multiplexing (FDM), time division multiplexing (TDM), or a combination thereof. Due to its flexibility, FDM multiplexing may be a desirable technique for multiplexing the R-PDCCH with other traffic on the downlink backhaul link. In general, FDM multiplexing provides the maximum flexibility in terms of scheduling conventional UEs (e.g., Release 8 or "legacy" UEs) in the same subframe together with R-PDCCH, R-PDSCH and PDSCH for more advanced UEs (Release 9 or higher "non-legacy" UEs). FDM multiplexing also allows reuse of dedicated reference signals (DRS) patterns designed for LTE-A in the context of Coordinated Multipoint (CoMP) operation.

Figure 4:
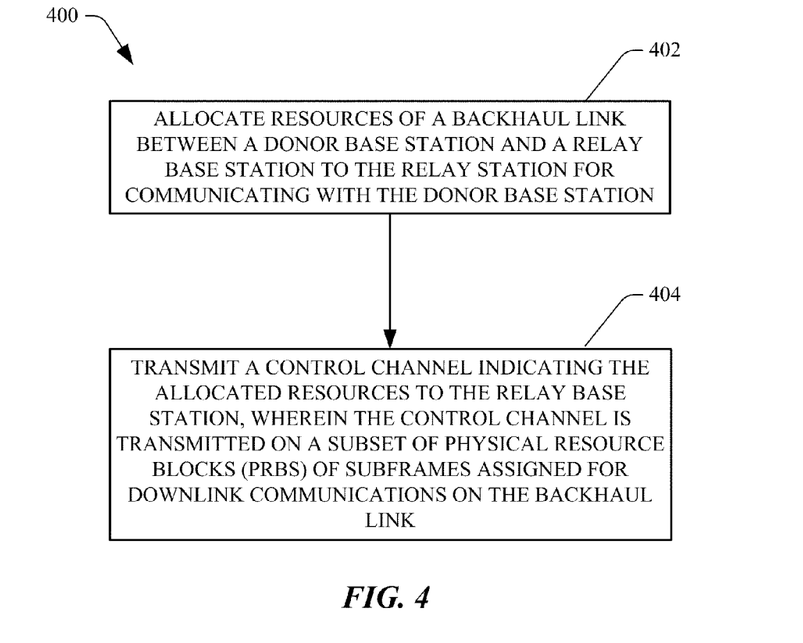
FIG. 4 illustrates example operations that may be performed by a donor base station according to an aspect of the present disclosure.

FIG. 4 illustrates example operations 400 that may be performed by a donor base station to allocate backhaul resources to a relay station, according to an aspect of the present disclosure.

The operations 400 begin, at 402, by allocating resources of a backhaul link between a donor base station and a relay base station to the relay station for communicating with the donor base station. At 404, the donor BS transmits a control channel (e.g., R-PDCCH) indicating the allocated resources to the relay base station, wherein the control channel is transmitted on a subset of physical resource blocks (PRBs) of subframes assigned for downlink communications on the backhaul link.

Figure 5:
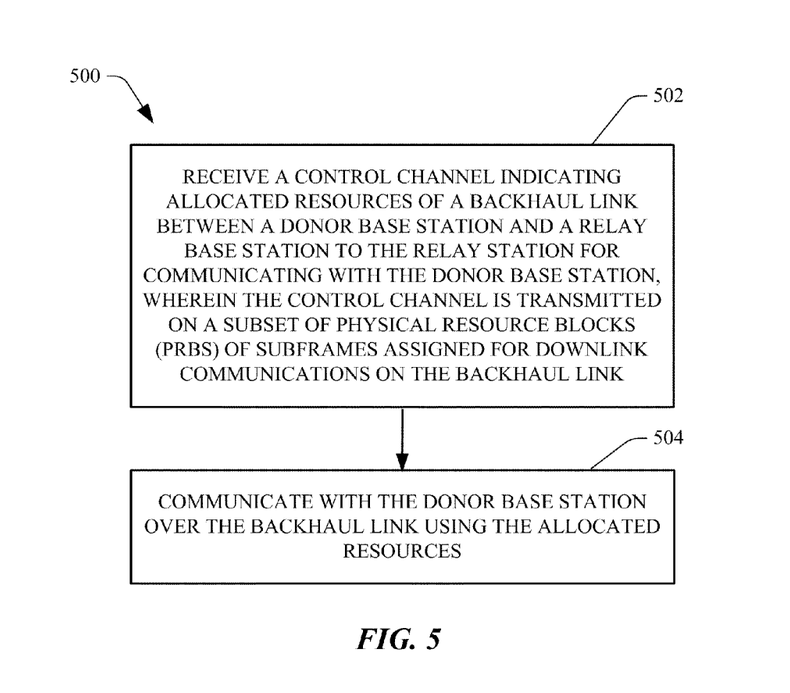
FIG. 5 illustrates example operations that may be performed by a relay base station according to an aspect of the present disclosure.

FIG. 5 illustrates example operations 500 that may be performed by a relay base station according to an aspect of the present disclosure. In other words, the operations 500 may be performed by a relay BS receiving backhaul resource allocation from a donor BS in accordance with the operations 400.

The operations 500 begin, at 502, by receiving the control channel (e.g., R-PDCCH) indicating allocated resources of the backhaul link, wherein the control channel is transmitted on a subset of physical resource blocks (PRBs) of subframes assigned for downlink communications on the backhaul link. At 504, the relay BS communicates with the donor BS over the backhaul link using the allocated resources.

Figure 6:
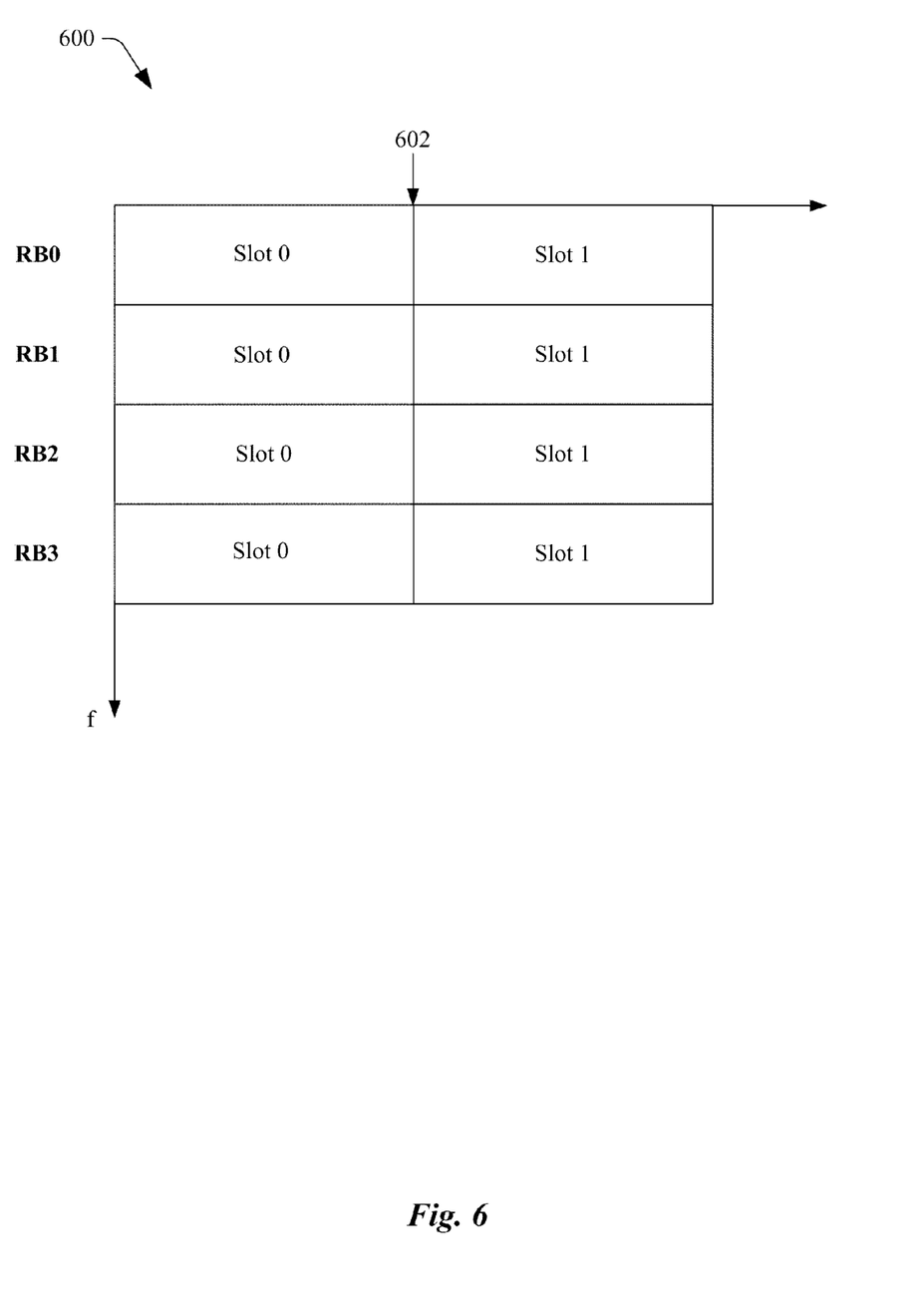
FIG. 6 illustrates localized R-PDCCH resources, which are contiguous in frequency.

Various types of resource allocation may be used to map R-PDCCH to PRBs on the downlink backhaul link. For example, FIG. 6 illustrates an example resource grid 600 where R-PDCCH is mapped to four RBs (RB0, RB1, RB2, and RB3) that are contiguous in frequency and do not hop in time, within a subframe, across a slot boundary 602.

Figure 7:
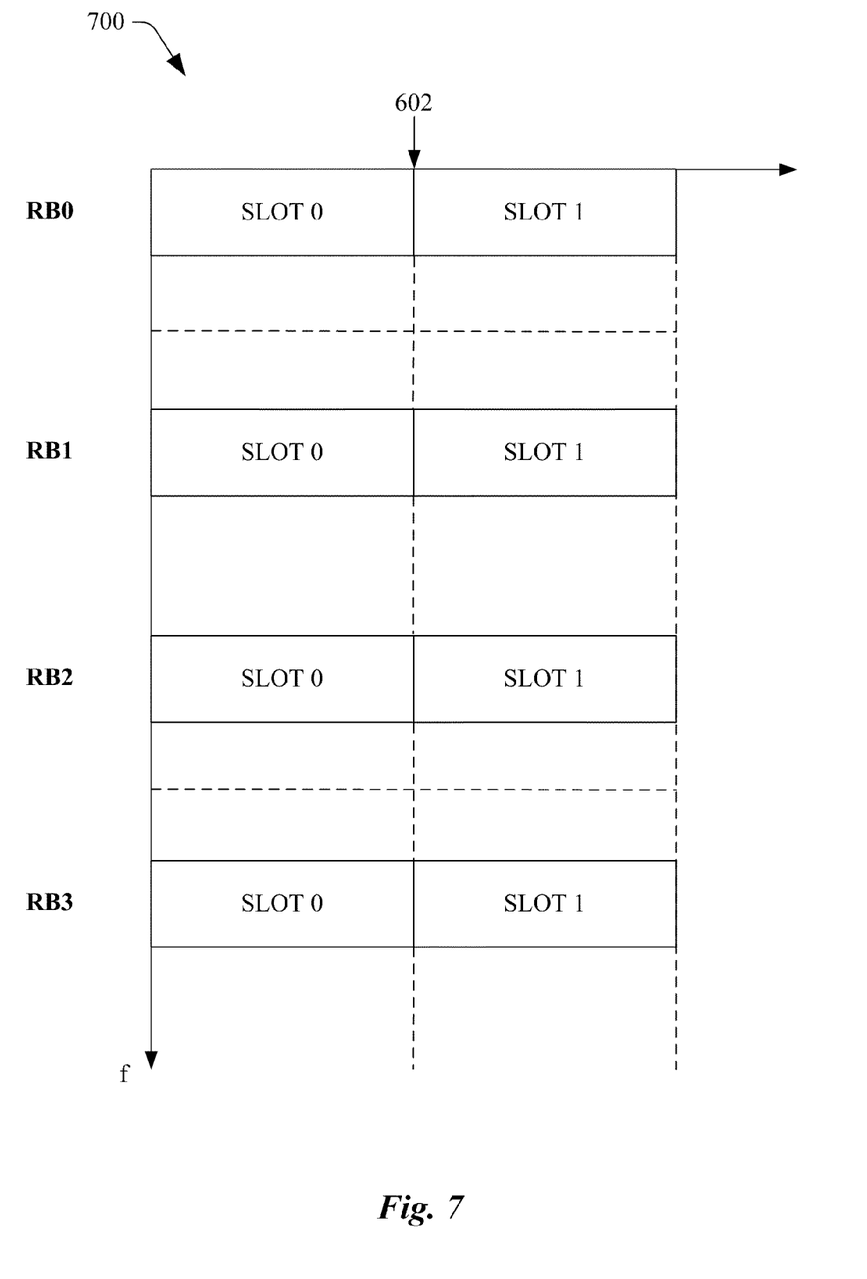
FIG. 7 illustrates distributed R-PDCCH resources, which are non-contiguous in frequency.
Figure 8:
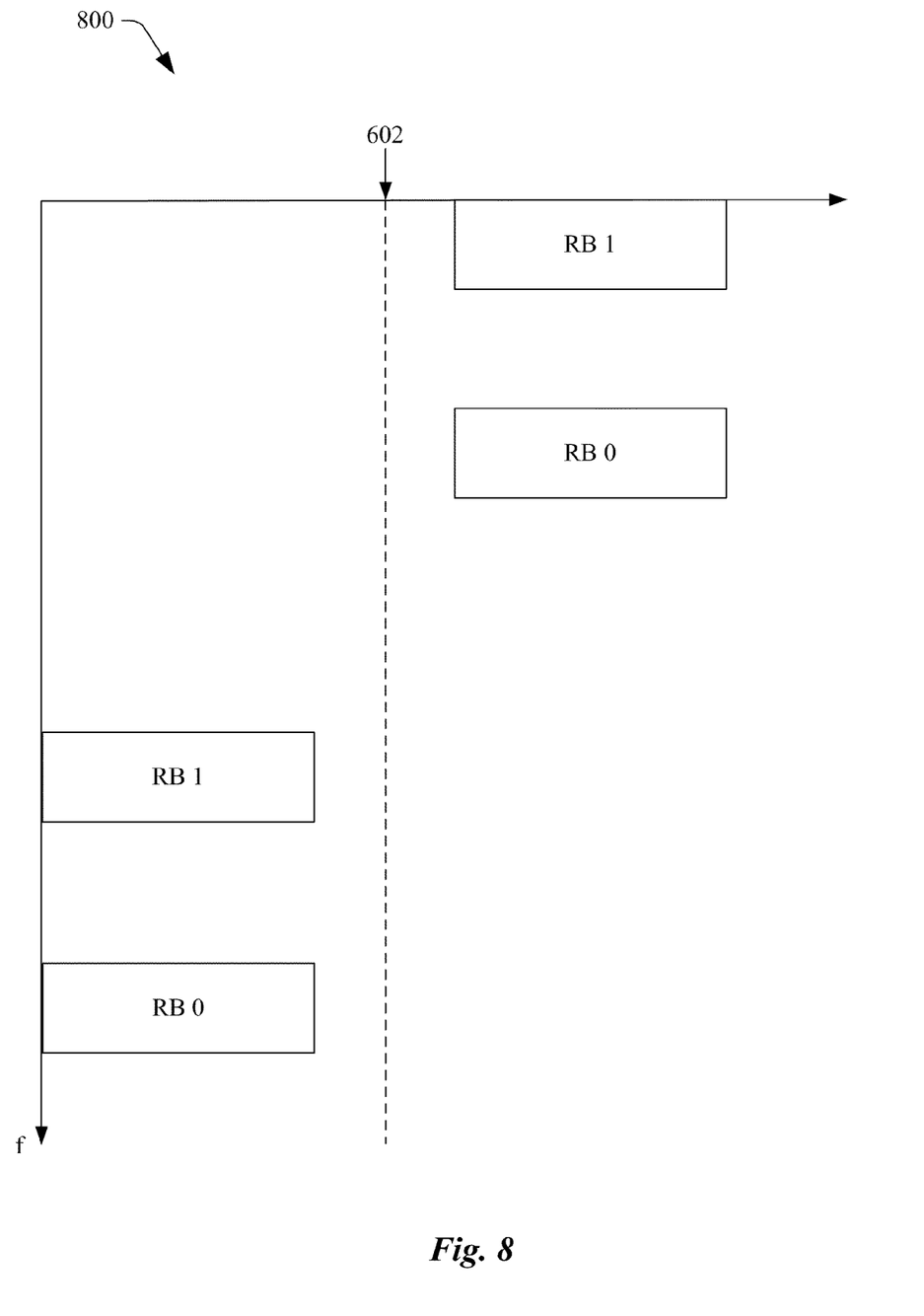
FIG. 8 illustrates an example of distributed R-PDCCH resources, which are non-contiguous in frequency and hop in time within a subframe.

As another example, FIG. 7 illustrates an example of distributed resource allocation, with a resource grid 700 where the four RBs are non-contiguous in frequency, but still do not hop in time, within a subframe, across the slot boundary 602. Distributing the PRBs across frequency may help improve frequency diversity. As still another example, FIG. 8 illustrates an example resource grid 800 where the four RBs are non-contiguous in frequency and hop in time within a subframe.

Figure 9:
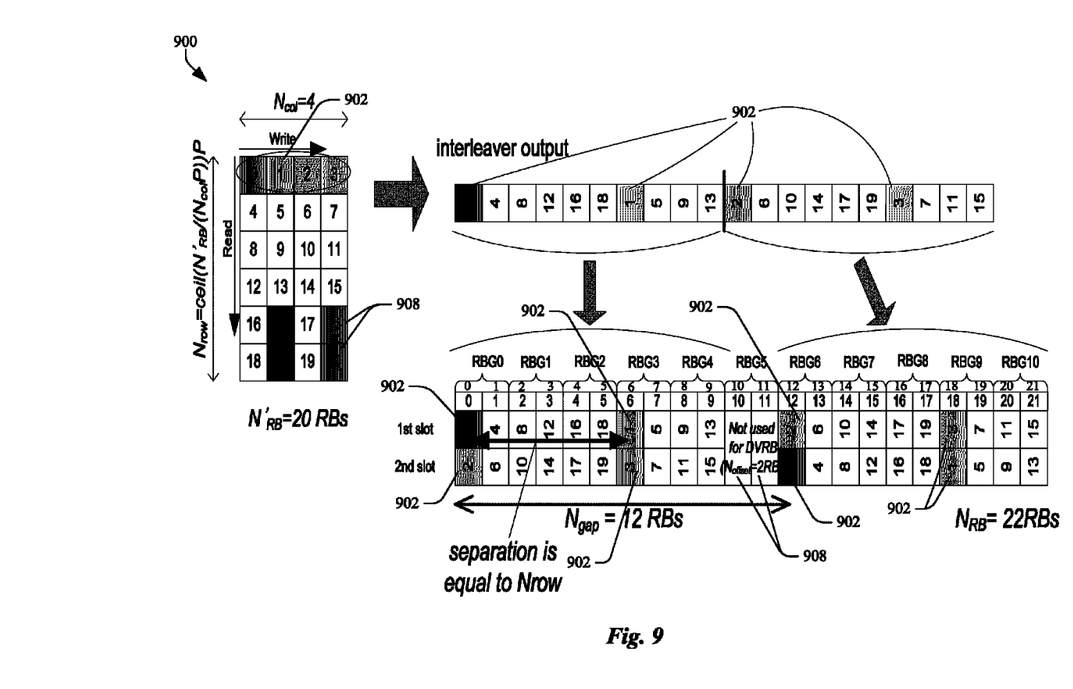
FIG. 9 illustrates an example mapping of logical resource blocks to physical resource blocks, which are non-contiguous in frequency and hop in time within the subframe.

FIG. 9 illustrates distributed resource allocation (e.g., as shown in FIG. 7) in greater detail. As illustrated in the logical resource grid 900, the RBs 902 allocated for R-PDCCH may be contiguous logically, but they may be mapped to PRBs are non-contiguous and hop across the slot boundary within the subframe, as illustrated. As illustrated, certain RBs 908 (illustratively, RB10 and RB11) may not be addressed in distributed resource allocation for a physical shared data channel of a UE. According to certain aspects, a location of the RBs for the control channel may be centered around these RBs.

As illustrated in FIG. 9, there may be a gap value Ngap. As shown in Table 1-1 below, a single gap value may be defined for small system bandwidths, and two for large bandwidths:

TABLE 1-1

RB gap values

| System BW ($N_{RB}^{DL}$) | Gap ($N_{gap}$) | |
|---|---|---|
| | $1^{st}$ Gap ($N_{gap}$, 1) | $2^{nd}$ Gap ($N_{gap}$, 2) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

In the example of FIG. 9, there are 22 RBs, thus a single gap is 12 (Ngap=12). The selection of the gap value in case of large system bandwidth is typically done a per UE basis, and in a dynamic manner (indicated using 1-bit in DCI format 1A/1B/1D).

Figure 10:
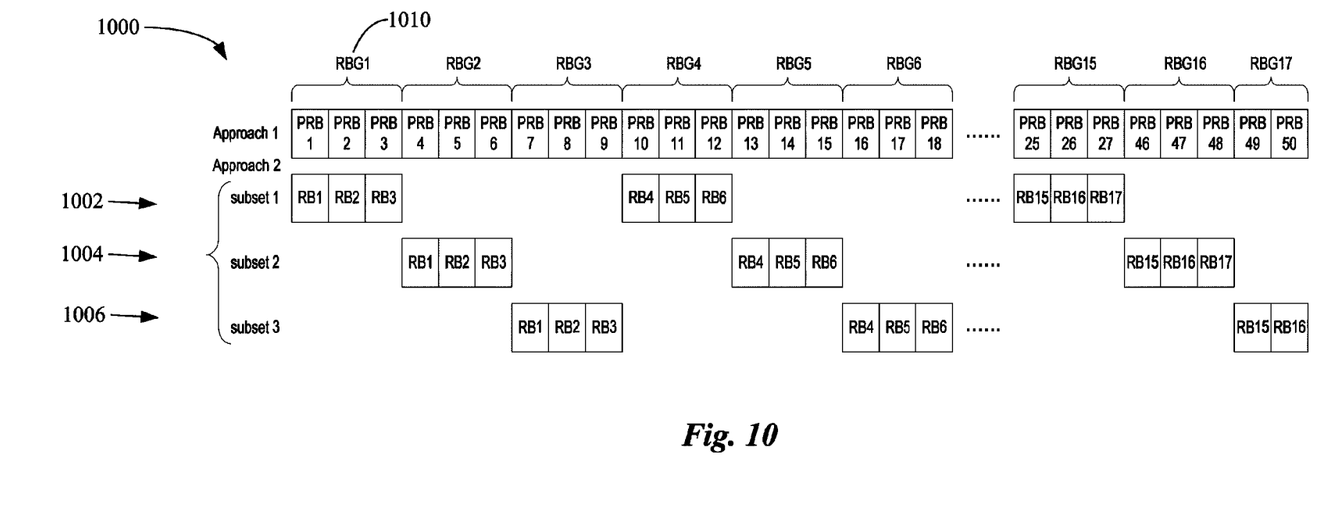
FIG. 10 illustrates an example partitioning of resource block groups into subsets.

The location and the sizes of the R-PDCCH may be preconfigured or broadcasted. According to certain aspects, PRBs allocated for R-PDCCH may be signaled via a bitmap, for example, with a one-to-one mapping or some other approach. As illustrated in FIG. 10, with a first approach, a bitmap may indicate which resource block groups 1010 (RBG1-RBG17) and/or RBs within each group are allocated for R-PDCCH. Thus, a single bit may be required for each RBG or RB, which may be relatively expensive, in terms of signaling overhead. In the second approach, RBGs may be divided into subsets. In the illustrated example, RBG1-RBG17 are divided into subset 1002 with RBG1, RBG4 . . . RBG15, subset 1004 with RBG2, RBG5, . . . RBG16, and subset 1006 with RBG3, RBG6, . . . RGB17. Two bits may be used to indicate one of the subsets, while another set of bits may be used to indicate which RBGs within the subset are allocated for R-PDCCH.

A general design decision is how to select the size and (optionally, the hopping) of R-PDCCH such that the design has minimal impact on PDSCH resource allocation. As shown in Table 1-2 below, RB group size may also depend on system bandwidth:

TABLE 1-2

| System Bandwidth $N_{RB}^{DL}$ | RBG Size (P) |
|---|---|
| ≤10 | 1 |
| 11-26 | 2 |
| 27-63 | 3 |
| 64-110 | 4 |

According to certain aspects, a size of R-PDCCH may be aligned with a bandwidth-dependent resource block group (RBG) size. As an example, for a 20 MHz, RBG size is 2 and, thus, the size of R-PDCCH resource may be integer multiples of 2 RBs (e.g., 4 RBs or 2 RBs for finer granularity). A larger granularity may result in wasted RBs, while a finer granularity may result in an increase in signaling overhead to indicate the locations of more groups of RBs.

As noted above, for localized R-PDCCH resource allocation (as shown in FIG. 6), the location of R-PDCCH can be centered around the RBs which may not be addressed (e.g., RBs 10 and 11 as shown in FIG. 9).

For distributed R-PDCCH resource allocation (as shown in FIGS. 7 and 8), the "gap" in the non-contiguous R-PDCCH resource location may be aligned with the gap defined for PDSCH. As noted above, there are two gaps values for large system bandwidth. In this case, the "gap" for R-PDCCH may be aligned with one of the gap values for PDSCH (e.g., the first one). 1. According to certain aspects, the R-PDCCH resource size may be selected considering other principles in DVRB design. As an example, if the diversity level in PDSCH DVRB is four, the gap and the granularity of R-PDCCH resource may be determined taking this into account, for example, using the same gap as in PDSCH and in multiples of 4 RBs, regardless (independent) of system bandwidth.

Figure 11:
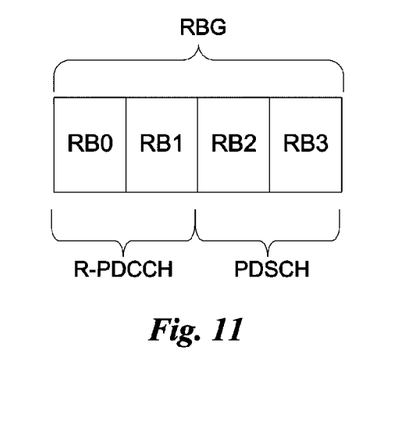
FIG. 11 illustrates an example pairing of R-PDCCH resources with PDSCH resources.

For R-PDCCH resource allocation with PRBs that are non-contiguous in frequency and with hops across slot boundaries (as illustrated in FIG. 8), R-PDCCH location considerations as above may be taken into account. Regarding R-PDCCH resource size granularity, this may be a fraction of 4 RBs (e.g., 2 RBs, or 1 RB), such that an R-PDCCH can pair with a DVRB PDSCH assignment. As an example, as illustrated in FIG. 11, 2 RBs of R-PDCCH may be paired with another 2 RBs for PDSCH transmission (e.g., RB0 and RB1 for R-PDCCH, RB2 and RB3 for PDSCH). While illustrated as logically contiguous, RB0-RB3 may be non-contiguous in frequency and hop across slot boundaries (as shown in FIG. 8).

Figure 4A:
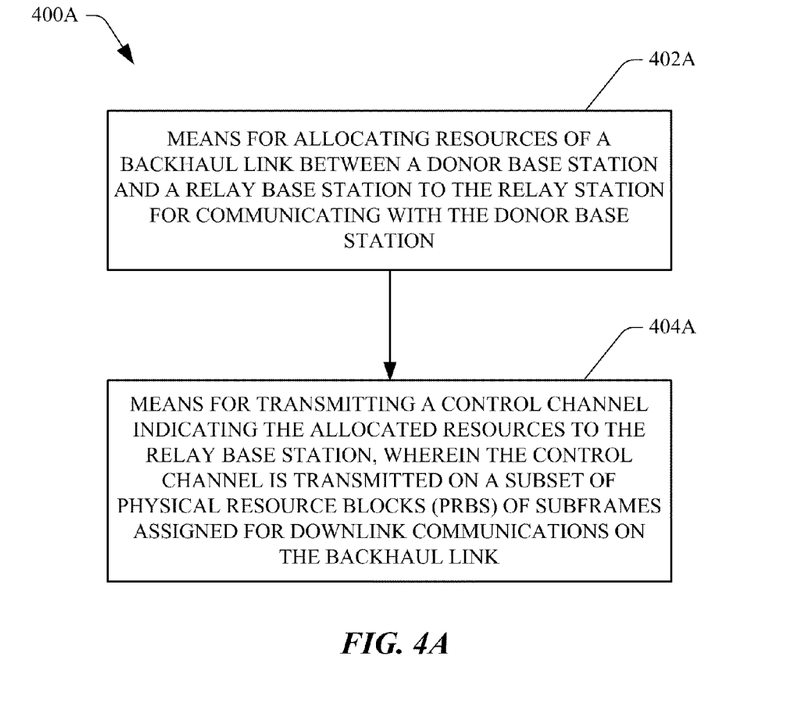
Figure 5A:
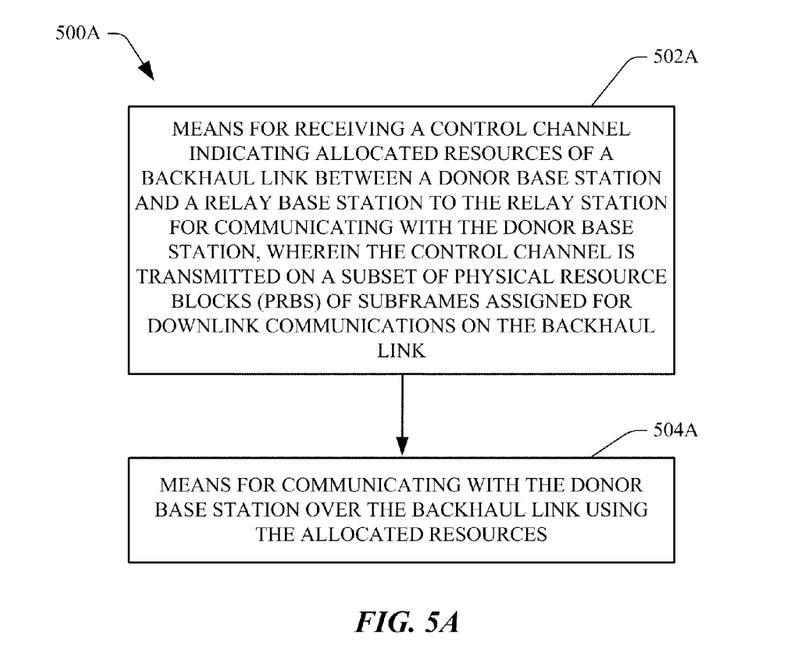

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 400 and 500 illustrated in FIGS. 4 and 5 correspond to means-plus-function blocks 400A and 500A illustrated in FIGS. 4A and 5A.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
    allocating resources of a backhaul link between a donor base station and a relay base station to the relay base station for communicating with the donor base station; and
    transmitting a control channel indicating the allocated resources to the relay base station, wherein the control channel is transmitted on a subset of physical resource blocks (PRBs) of subframes assigned for downlink communications on the backhaul link, and wherein a size of the control channel is aligned with a bandwidth-dependent resource block group (RBG) size.

2. The method of claim 1, wherein the control channel is transmitted on PRBs that are contiguous in frequency and do not hop in time within a subframe.

3. The method of claim 1, wherein a location of the control channel is centered around resource blocks that are not used in distributed resource allocation of resource blocks for a physical shared data channel of a UE.

4. The method of claim 1, wherein the control channel is transmitted on PRBs that are non-contiguous in frequency and do not hop in time within a subframe.

5. The method of claim 4, wherein a gap in the non-contiguous PRBs is aligned with a defined gap in resource blocks defined for a physical shared data channel of a UE.

6. The method of claim 4, wherein a size of the control channel has a granularity of N RBs, wherein N is independent of system bandwidth.

7. The method of claim 1, wherein the control channel is transmitted on PRBs that are non-contiguous in frequency and hop in time within a subframe.

8. The method of claim 7, wherein:
    a size of the control channel has a granularity of N RBs, wherein N is a fraction of a bandwidth-dependent resource block group (RBG) size; and
    one or more RBs of the control channel are transmitted with one or more RBs of a physical shared data channel of a UE within the same RBG.

9. The method of claim 1, further comprising transmitting a set of bits indicating locations of the PRBs.

10. A method for wireless communications, comprising:
    receiving a control channel indicating allocated resources of a backhaul link between a donor base station and a relay base station for the relay base station for communicating with the donor base station, wherein the control channel is transmitted on a subset of physical resource blocks (PRBs) of subframes assigned for downlink communications on the backhaul link; and communicating with the donor base station over the backhaul link using the allocated resources, and wherein a size of the control channel is aligned with a bandwidth-dependent resource block group (RBG) size.

11. The method of claim 10, wherein the control channel is transmitted on PRBs that are contiguous in frequency and do not hop in time within a subframe.

12. The method of claim 10, wherein a location of the control channel is centered around resource blocks that are not used in distributed resource allocation of resource blocks for a physical shared data channel of a UE.

13. The method of claim 10, wherein the control channel is transmitted on PRBs that are non-contiguous in frequency and do not hop in time within a subframe.

14. The method of claim 13, wherein a gap in the non-contiguous PRBs is aligned with a defined gap in resource blocks defined for a physical shared data channel of a UE.

15. The method of claim 13, wherein a size of the control channel has a granularity of N RBs, wherein N is independent of system bandwidth.

16. The method of claim 10, wherein the control channel is transmitted on PRBs that are non-contiguous in frequency and hop in time within a subframe.

17. The method of claim 16, wherein:
a size of the control channel has a granularity of N RBs, wherein N is a fraction of a bandwidth-dependent resource block group (RBG) size; and
one or more RBs of the control channel are transmitted with one or more RBs of a physical shared data channel of a UE within the same RBG.

18. The method of claim 10, further comprising receiving a set of bits indicating locations of the PRBs.

19. An apparatus for wireless communications, comprising:
means for allocating resources of a backhaul link between a donor base station and a relay base station to the relay base station for communicating with the donor base station; and
means for transmitting a control channel indicating the allocated resources to the relay base station, wherein the control channel is transmitted on a subset of physical resource blocks (PRBs) of subframes assigned for downlink communications on the backhaul link, and wherein a size of the control channel is aligned with a bandwidth-dependent resource block group (RBG) size.

20. The apparatus of claim 19, wherein the control channel is transmitted on PRBs that are contiguous in frequency and do not hop in time within a subframe.

21. The apparatus of claim 19, wherein a location of the control channel is centered around resource blocks that are not used in distributed resource allocation of resource blocks for a physical shared data channel of a UE.

22. The apparatus of claim 19, wherein the control channel is transmitted on PRBs that are non-contiguous in frequency and do not hop in time within a subframe.

23. The apparatus of claim 22, wherein a gap in the non-contiguous PRBs is aligned with a defined gap in resource blocks defined for a physical shared data channel of a UE.

24. The apparatus of claim 22, wherein a size of the control channel has a granularity of N RBs, wherein N is independent of system bandwidth.

25. The apparatus of claim 19, wherein the control channel is transmitted on PRBs that are non-contiguous in frequency and hop in time within a subframe.

26. The apparatus of claim 25, wherein:
a size of the control channel has a granularity of N RBs, wherein N is a fraction of a bandwidth-dependent resource block group (RBG) size; and
one or more RBs of the control channel are transmitted with one or more RBs of a physical shared data channel of a UE within the same RBG.

27. The apparatus of claim 19, further comprising means for transmitting a set of bits indicating locations of the PRBs.

28. An apparatus for wireless communications, comprising:
means for receiving a control channel indicating allocated resources of a backhaul link between a donor base station and a relay base station for the relay base station for communicating with the donor base station, wherein the control channel is transmitted on a subset of physical resource blocks (PRBs) of subframes assigned for downlink communications on the backhaul link; and
means for communicating with the donor base station over the backhaul link using the allocated resources, and wherein a size of the control channel is aligned with a bandwidth-dependent resource block group (RBG) size.

29. The apparatus of claim 28, wherein the control channel is transmitted on PRBs that are contiguous in frequency and do not hop in time within a subframe.

30. The apparatus of claim 28, wherein a location of the control channel is centered around resource blocks that are not used in distributed resource allocation of resource blocks for a physical shared data channel of a UE.

31. The apparatus of claim 28, wherein the control channel is transmitted on PRBs that are non-contiguous in frequency and do not hop in time within a subframe.

32. The apparatus of claim 31, wherein a gap in the non-contiguous PRBs is aligned with a defined gap in resource blocks defined for a physical shared data channel of a UE.

33. The apparatus of claim 31, wherein a size of the control channel has a granularity of N RBs, wherein N is independent of system bandwidth.

34. The apparatus of claim 28, wherein the control channel is transmitted on PRBs that are non-contiguous in frequency and hop in time within a subframe.

35. The apparatus of claim 34, wherein:
a size of the control channel has a granularity of N RBs, wherein N is a fraction of a bandwidth-dependent resource block group (RBG) size; and
one or more RBs of the control channel are transmitted with one or more RBs of a physical shared data channel of a UE within the same RBG.

36. The apparatus of claim 28, further comprising means for receiving a set of bits indicating locations of the PRBs.

37. An apparatus for wireless communications, comprising:
at least one processor configured to
allocate resources of a backhaul link between a donor base station and a relay base station to the relay base station for communicating with the donor base station, and
transmit a control channel indicating the allocated resources to the relay base station, wherein the control channel is transmitted on a subset of physical resource blocks (PRBs) of subframes assigned for downlink communications on the backhaul link, and wherein a size of the control channel is aligned with a bandwidth-dependent resource block group (RBG) size; and
a memory coupled with the at least one processor.

38. An apparatus for wireless communications, comprising:
- at least one processor configured to
- receive a control channel indicating allocated resources of a backhaul link between a donor base station and a relay base station for the relay base station for communicating with the donor base station, wherein the control channel is transmitted on a subset of physical resource blocks (PRBs) of subframes assigned for downlink communications on the backhaul link, and
- communicate with the donor base station over the backhaul link using the allocated resources, and wherein a size of the control channel is aligned with a bandwidth-dependent resource block group (RBG) size; and
- a memory coupled with the at least one processor.

39. A computer-program product for wireless communications, the computer-program product comprising a computer-readable medium comprising code for:
- allocating resources of a backhaul link between a donor base station and a relay base station to the relay base station for communicating with the donor base station; and
- transmitting a control channel indicating the allocated resources to the relay base station, wherein the control channel is transmitted on a subset of physical resource blocks (PRBs) of subframes assigned for downlink communications on the backhaul link, and wherein a size of the control channel is aligned with a bandwidth-dependent resource block group (RBG) size.

40. A computer-program product for wireless communications, the computer-program product comprising a computer-readable medium comprising code for:
- receiving a control channel indicating allocated resources of a backhaul link between a donor base station and a relay base station for the relay base station for communicating with the donor base station, wherein the control channel is transmitted on a subset of physical resource blocks (PRBs) of subframes assigned for downlink communications on the backhaul link; and
- communicating with the donor base station over the backhaul link using the allocated resources, wherein a size of the control channel is aligned with a bandwidth-dependent resource block group (RBG) size.

41. The method of claim 1, wherein the control channel comprises a physical downlink control channel.

42. The method of claim 1, wherein the resources are allocated for at least one of a physical downlink shared channel or a physical uplink shared channel.

43. The apparatus of claim 19, wherein the control channel comprises a physical downlink control channel.

44. The apparatus of claim 19, wherein the resources are allocated for at least one of a physical downlink shared channel or a physical uplink shared channel.

45. The method of claim 1, wherein the RBG size is an integer multiple of 2 resource blocks.

* * * * *